G. T. SPAULDING.
Broom Head.
No. 54,035.
Patented April 17, 1866.
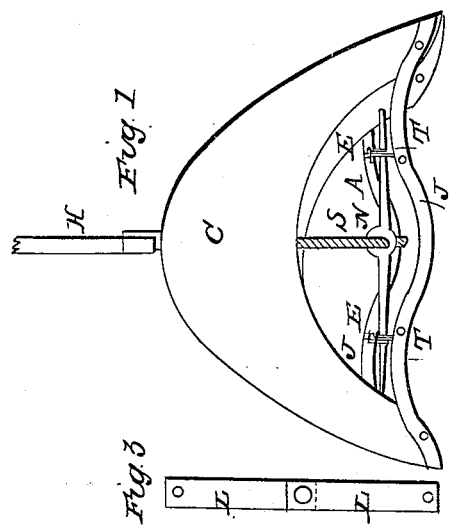
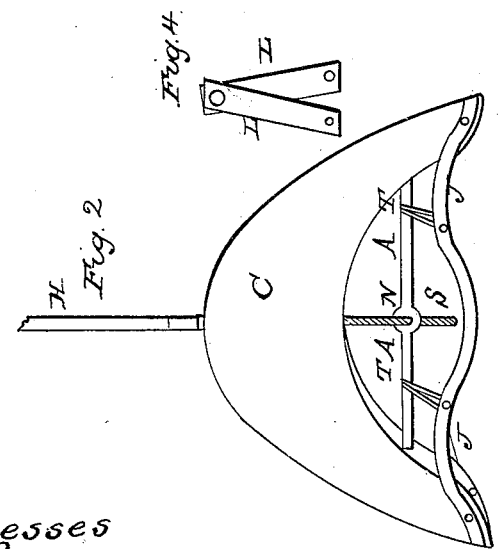
Witnesses
C. C. Budley
Norman Hall
Inventor
Geo. P. Spaulding

UNITED STATES PATENT OFFICE.

GEORGE T. SPAULDING, OF BRODHEAD, WISCONSIN.

IMPROVED BROOM-HEAD.

Specification forming part of Letters Patent No. 54,035, dated April 17, 1866.

*To all whom it may concern:*

Be it known that I, GEORGE T. SPAULDING, of Brodhead, in the county of Green, in the State of Wisconsin, have invented a new and Improved Method of Constructing Broom-Heads; and I do hereby declare the following to be a full and exact description thereof, reference being had to the accompanying drawings, and the letters of reference marked thereon.

The nature of my invention consists in providing a metallic broom-head which operates as a vise, in which the material used as broom-brush is securely grasped.

To enable others skilled in the art to make and use my invention, I will describe its construction and operation.

I construct this metallic broom-head as seen in Figures 1 and 2 in the accompanying drawings.

C, as seen, is a hood or cap, which receives the butts of the brush and covers the same. J J are jaws or bars riveted or connected with the extreme points of the cap C, one jaw on each side thereof. L L are toggle-joint levers, as seen in all the figures of the drawings, which are connected with the jaws on their inner surfaces by an ear or other form of connection, so as to secure a joint motion. The nut N, through which the screw-shank S operates, has long arms A A, which pass through the levers L L, thus making a toggle-joint therewith.

When the broom-handle H is so turned as to withdraw the shank S through the nut N the levers L L are forced down until in a line, as seen in Fig. 3, thereby forcing the jaws J apart, when brush may be inserted between them and each side of the long-armed nut until the head is full. Then, by rotating the handle back again, so as to turn the shank S into and through the nut, the levers L L assume the position seen in Fig. 4, thus compressing the brush between them and around the nut N, thereby holding it firmly.

The metallic cap C is made of sufficient elasticity to allow the necessary motion of the jaws in opening to receive and closing upon the broom-brush.

I claim—

A metallic broom-head furnished with the nut and toggle-joint, the jaws being operated, as described, by a screw-shank, substantially as set forth.

GEO. T. SPAULDING.

Witnesses:
C. C. BRADLEY,
NORMAN HALL.